United States Patent

Campbell et al.

Patent Number: 5,125,179
Date of Patent: Jun. 30, 1992

[54] NONMETALLIC TUBULAR STRUCTURE

[75] Inventors: Thomas G. Campbell, Concord; Glenn A. Freitas, Foxboro, both of Mass.

[73] Assignee: The United States of America as represented by the Secretary of the Air Force, Washington, D.C.

[21] Appl. No.: 685,063

[22] Filed: Apr. 8, 1991

[51] Int. Cl.⁵ ............................................... F41A 21/02
[52] U.S. Cl. ..................................... 42/76.02; 89/16; 428/34.4; 428/36.3
[58] Field of Search ................ 42/76.01, 76.02; 89/15, 89/16; 428/34.4, 36.3; 138/144, 149, 153, DIG. 5

[56] References Cited

U.S. PATENT DOCUMENTS

| | | | |
|---|---|---|---|
| 3,813,098 | 5/1974 | Fischer et al. | 273/72 R |
| 4,155,791 | 5/1979 | Higuchi | 156/161 |
| 4,401,729 | 8/1983 | Claussen et al. | 428/623 |
| 4,435,455 | 3/1984 | Prewo et al. | 428/36.3 |
| 4,485,721 | 12/1984 | Shankhla et al. | 89/15 |
| 4,646,615 | 3/1987 | Gladstone et al. | 89/15 |
| 4,669,212 | 6/1987 | Jackson et al. | 42/76.02 |
| 4,822,759 | 4/1989 | Newkirk et al. | 501/127 |
| 4,834,616 | 5/1989 | Kasarsky et al. | 416/229 R |
| 4,846,911 | 7/1989 | Tackett et al. | 89/15 |
| 4,884,489 | 12/1989 | Zowarka et al. | 89/16 |

FOREIGN PATENT DOCUMENTS

3122316 12/1982 Fed. Rep. of Germany ..... 42/76.02

OTHER PUBLICATIONS

Final Report, "Lightweight Nonmetallic High Performance Gun Barrels", Joseph S. Boyce & Thomas G. Campbell, Air Force Technical Report AFE-0297-F-M-8779-153, Oct. 1988; DTIC No. AD-B129-947.

Primary Examiner—Michael J. Carone
Attorney, Agent, or Firm—Edward W. Nypaver; Donald J. Singer

[57] ABSTRACT

A nonmetallic tubular structure and method of making the same comprising a tubular ceramic linear surrounded by a thermal insulating composite tube and an outer braided sleeve of a graphite fiber/epoxy composite tensioned to generate compressive stresses in the ceramic liner and maintained in compression by curing the sleeve while under tension.

16 Claims, 2 Drawing Sheets

NONMETALLIC TUBULAR STRUCTURE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to high strength nonmetallic tubular structures and, more particularly, to a composite tubular structure exposed to extreme internal pressures and temperatures and the method of making the same.

While not limited thereto, the present invention is particularly adapted to form an improved composite tubular structure for use as a gun barrel resistant to abrasion and corrosion. Gun barrels have traditionally been formed of steel and steel alloys and have admirably served the purposes for which they were intended. However, advancements in ammunition technology providing improved accuracy with high muzzle velocities has also imposed limitations on existing steel gun barrels. The use of such improved ammunition generates higher propellant gas temperatures and rates of fire with resultant increases in gun barrel temperatures beyond the working range of steel. Wear and erosion rates are increased at these higher temperatures to severely limit the life cycle of steel gun barrels. For example, the M61 automatic weapon has only a 30,000 round life at a 1,000 round per minute firing rate for each barrel.

As a result, many attempts have been made to develop nonmetallic gun barrels. One known expedient is to form the gun barrel liner, which is directly exposed to the high temperature propellant gases, of a ceramic material. While monolithic ceramics have inherently low tensile strength and exhibit brittle failure characteristics, recent improvements in ceramic technology have significantly improved the strength and fracture toughness of those materials. For example, the addition of whisker reinforcement of silicon carbide (SiC) has dramatically increased the toughness and strength of ceramics. Other approaches to ceramic composites have been developed on the molecular scale by transforming the phase of included particles to toughen the ceramic. Moreover, fabrication techniques are being improved to increase the reliability and consistency of ceramic properties. Nevertheless, gun barrel liner stresses during rapid firing will exceed even the improved tensile strengths of ceramics. In order to employ ceramics as gun barrel liners, they must be precompressed. It has been demonstrated that those ceramic barrel liners which can be successfully precompressed show promising results. The classical method of precompressing a ceramic liner consists of shrink fitting a steel sleeve over the liner. While this shrink fitting technique has merit and has been partially successful, it does pose certain problems. For example, tolerance on diameters, variable coolin of the steel, and nonuniform contact stresses have resulted in cracking of the ceramic liners during the precompression process. In use of the finished product, a major limitation is expansion of the steel sleeve at a greater rate than the ceramic liner which tends to offload the precompression initially induc therein. This requires over compressing the ceramic liner fabrication and the increased shrink fit necessary creates significant manufacturing difficulties. Also, the higher temperatures required for over compressing produces axial thermal expansion of the ceramic liner resulting in undesirable tensioning thereof.

SUMMARY OF THE INVENTION

Accordingly, a primary object of the present invention is obviate the above noted disadvantages by providing an improved nonmetallic composite tubular structure and the method of fabricating the same.

Another object of this invention is to provide the foregoing tubular structure and method with a ceramic liner maintained in precompression to withstand extreme internal pressures and temperatures without wear and erosion.

Still another object of the present invention is to provide a nonmetallic gun barrel which is low in costs, strong and rugged in construction, durable and longlasting in use, and capable of rapid repeated cycling under extreme internal pressures and temperatures without deterioration.

A further object of this invention is to provide the foregoing gun barrel with a precompressed ceramic liner and a tensioned braided overwrap maintaining the liner in a precompressed condition during use.

Still a further object of the present invention is to cure the foregoing braided overwrap while under tension.

In one aspect thereof, the composite tubular structure of the present invention and the method of making the same is characterized by the provision of a precompressed ceramic liner or inner tube surrounded by a thermal insulating composite tube and an outer braided sleeve of graphite fibers tensioned to generate and maintain compressive stresses in said inner ceramic liner to withstand shock, extreme internal pressures, and elevated temperatures without wear and erosion. The graphite fibers are wrapped and braided about the liner-/insulator in layers and tensioned axially along the length of the liner to precompress the liner. The braided overwrap is cured while under tension to maintain the liner in precompression during subsequent usage.

The foregoing and other objects, advantages and characterizing features of this invention will become clearly apparent from the ensuing detailed description thereof, taken together with the accompanying drawings, wherein like reference characters denote like parts throughout the various views.

BRIEF DESCRIPTION OF THE DRAWING FIGURES

DETAILED DESCRIPTION OF AN ILLUSTRATIVE EMBODIMENT

Figure 1:
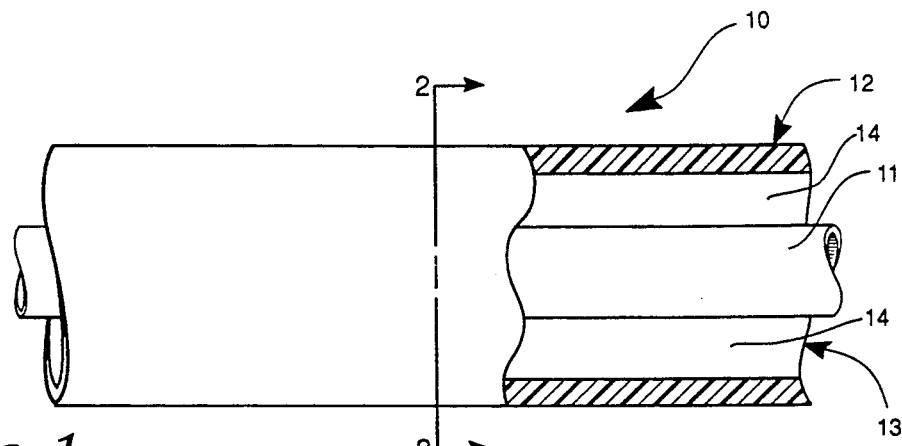
FIG. 1 is a side elevational view, partly in section, of a tubular structure constructed in accordance with this invention broken away to indicate an indeterminate length.

Referring now in detail to the illustrative embodiment depicted in the accompanying drawings, there is shown in FIG. 1 a tubular structure adapted for use as a gun barrel, comprehensively designated 10, constructed in accordance with this invention. While this invention will be described in connection with a gun barrel, it should be understood that the principles of this invention are applicable to the formation and construction of any tubular structure intended to resist erosion and corrosion caused by high internal temperatures and pressures and extreme thermal and mechanical shock.

The gun barrel 10 comprises an inner ceramic bore liner 11 directly exposed to propellant gases, an outer sleeve or overwrap, generally designated 12, employed to precompress the liner and provide damage tolerant protection to the barrel, and an intermediate thermal insulator, generally designated 13, comprised of a plurality of wedge-like ceramic bars or sections 14 hereinafter more fully explained. This composite ceramic insulator 13 serves to efficiently reduce the heat transmitted to the outer sleeve 12 to within the operating temperature range of the matrix materials forming the sleeve as will hereinafter be more fully described.

The liner 11 is formed of a suitable ceramic or ceramic composite material possessing adequate fracture toughness, thermal shock resistance, and tensile strength at high operating barrel temperatures. A variety of ceramic materials can be utilized according to the invention including silicon nitride, silicon-aluminum-oxy-nitride, alumina, and silicon carbide whiskered alumina, for example. While not limited thereto, a SiC whisker reinforced alumina is the preferred composition for the liner 11. This material is cold pressed, sintered, and isostatically hot pressed and is commercially available under the designation CC5500 manufactured by the Advanced Composite Materials Corporation of Greer, S.C. The fracture toughness of pure alumina, which is on the order of 4 Ksi-in.$\frac{1}{2}$, is improved to a fracture toughness of about 6 Ksi-in.$\frac{1}{2}$ by the inclusion of the silicon carbide whisker reinforcement. This whisker reinforced alumina exhibits good thermal shock tolerance with its low coefficient of thermal expansion and maintains its mechanical properties at temperatures up to 2200° F.

A significant feature of this invention resides in forming the outer sleeve 12 of a pre-tensioned braided graphite composite structure. Since ceramic structural members inherently exhibit brittleness and low tensile strength, prestressing such members is necessary in order to increase the tensile strengths thereof. Known techniques involving ceramic liner precompression required a shrink fit steel liner as the outer sleeve. However, at elevated temperatures, the difference in the coefficient of thermal expansion results in an off-loading of the precompression. To avoid this, it has been found that a graphite fiber/epoxy composite, which can exhibit a negative coefficient of thermal expansion, can advantageously be used to form outer sleeve 12. Graphite fibers possess the high strength required to precompress the ceramic liner and have excellent property retention at elevated temperatures. Moreover, a careful selection of the fiber angle wrapping, as hereinafter more fully described, will result in increased liner compression with an increase in temperature.

A 33 Msi modulus, 500 Ksi tensile strand strength carbon fiber was selected for the overwrap. This material provides the necessary reactive stress during precompression of the ceramic liner. The matrix material selected for the outer sleeve composite is limited by temperature capability. Temperatures up to 600° F. are expected for a sustained burst of rapid gun fire. Resin systems such as polymides maintain their properties to 600° F. In addition to temperature considerations, the specific composition of the matrix material also is dependent on the overall thickness of the ceramic liner/insulator, as well as cost considerations. An example of a suitable matrix material is a thermosetting polymide identified as Thermid IP-600, manufactured by the National Starch and Chemical Company, and having improved processing characteristics as well as a continuous use temperature of 600° F. Another suitable matrix material having acceptable performance characteristics to 500° F. is a thermoplastic prepreg Poly (Ether Ether Ketone) sold under the trademark APC2 by ICI Americas, Inc. of Wilmington, Del.

Figure 4:
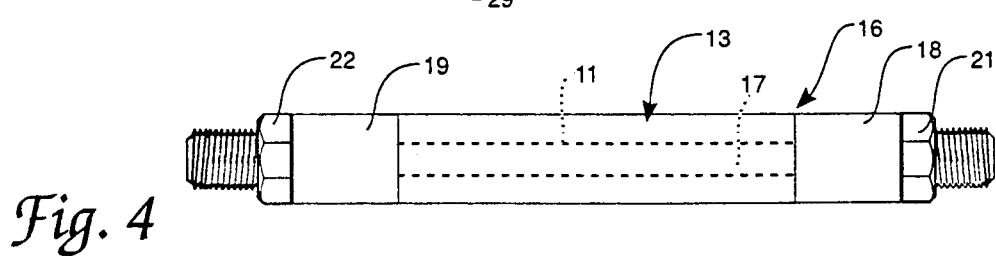
FIG. 4 is a side elevational view of a mandrel assembly employed in the fabrication of the composite tubular structure of the present invention.

The graphite fiber overwrap or sleeve 12 is fabricated by braiding the graphite fibers or filaments from a plurality of fiber tows directly onto the insulator/liner assembly. As shown in FIG. 4, a mandrel assembly, generally designated 16, is employed to secure the liner 11 and insulator 13 in place during the braiding operation. The mandrel assembly 16 comprises an elongated mandrel 17 for telescopically receiving the ceramic liner 11 as well as opposed steel sheaths 18 and 19 slidably mounted on the mandrel 17. The opposite ends of the mandrel 17 are threaded to receive nuts 21 and 22. The several sections 14 of insulator 13 are secured intact about the ceramic liner 11 and held in position by the friction generated by tightening the nuts 21 and 22. The fibers are wrapped about the insulator/liner assembly in one pass to form a single layer of braided fiber covering the insulator/liner assembly. The mandrel assembly 16 is nonrotating and translates axially through two counter-rotating rings which contain the fiber tows. Preferably, the braiding operation is performed with preimpregnated graphite fiber tow. Alternatively, the braiding operation can be accomplished with dry fibers, followed by a subsequent resin transfer molding process while the fibers are tensioned. These fibers are braided on the mandrel assembly at a large angle, such as 65°–70° from the barrel axis, and the fiber volume "as braided" in the fiber/epoxy composite is approximately 45%. A plurality of such layers are laminated to the desired thickness of the overwrap.

The SiC whiskered alumina and SiC whiskered silicon nitride ceramics maintain their strength at temperatures below 2200° F. still have appreciable strength at 2500° F. The tensile strength of the graphite fiber is unaffected by temperatures in the expected range of 300° F. to 600° F. As previously discussed, many matrix materials are available in these working temperature ranges. Thus, the expected operating temperatures of the materials make the principles of this invention feasible without any external cooling.

Figure 2:
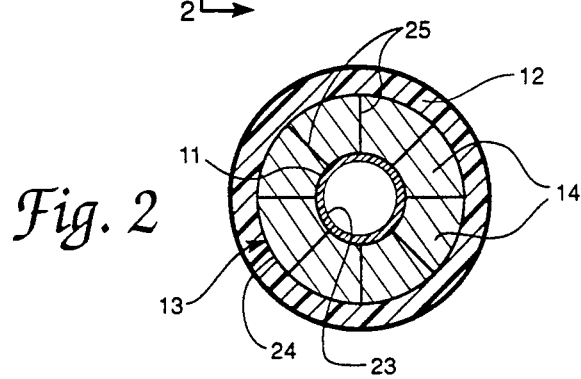
FIG. 2 is a cross sectional view taken about on line 2—2 of FIG. 1.

To insulate the graphite composite sleeve 12 within these operating temperatures by direct overwrapping onto the ceramic liner 11 of operating temperatures 2000° F. to 2500° F. requires a ceramic thickness of approximately 1.0 inch. Large precompressive pressures would be required for such a thick ceramic liner and the stresses induced in the outer sleeve to effect such precompression would be enormous. Hence, the ceramic thickness required for temperature insulation conflicts with the precompression capability of the graphite composite sleeve. The gun barrel construction shown in FIGS. 1 and 2 avoids this problem by incorporating the intermediate tubular insulator 13 for providing the remaining insulating thickness, thereby permitting the utility of a relatively thin ceramic liner which eliminates significant thermal stresses and is readily precompressed.

As earlier mentioned, the intermediate insulator 13 is of a composite construction comprised of a plurality of wedge-like ceramic bars or sections 14 interposed between the liner 11 and outer sleeve 12 in a circular, concentric array therebetween (FIG. 2) and extending lengthwise therewith (FIG. 1). The sections 14 are substantially identical in construction, each having an inner arcuate surface 23 complementary to the outside curvature of liner 11 and an outer arcuate surface 24 complementary to the inside surface of sleeve 12. Gaps are maintained between adjacent wedge sections 14. This insulating arrangement transfers liner radial precompression and firing pressures without inducing tangential stresses and serves to insulate the graphite outer sleeve to less than 600° F. The composite insulator 13 is exposed to a temperature gradient of from about 2200° F. at its inside diameter up to about 600° F. at the outside diameter thereof. This split insulator 13 possesses a low coefficient of thermal expansion, low thermal conductivity, high rupture strength, high compressive strength, and moderate tensile strength.

The gap between adjacent insulator sections 14 is filled with a suitable insulation material 25 having a thermal conductivity equivalent to the split insulating sections 14. This material 18 must be of low stiffness in the circumferential direction to permit tangential contraction of the insulating sections 14 with only minimal pressure load losses. The material 25 should possess high temperature capability to withstand the temperatures (up to 2500° F.) transmitted along the outside surface of liner 11, have a low compressive modulus, and exhibit low thermal conductivity. A suitable insulation material could be ceramic paper or, preferably, ceramic blanket material such as that fabricated by the Cotronics Corporation and identified as Cotronic Ceramic Paper of 1/32 inch thickness. Such materials are usable to 3000° F. and possess low stiffness properties. A carbon based fiberous paper, such as sold under the trademark GRAFOIL, also could be utilized as the insulating material 25, if desired.

Figure 5:
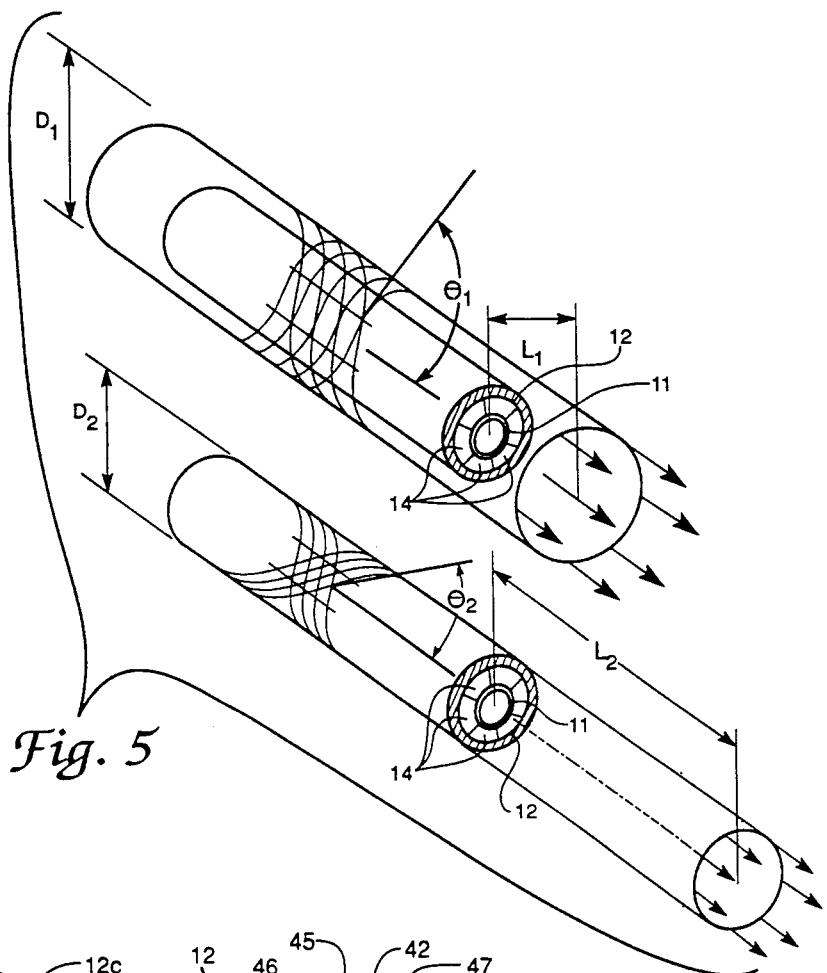
FIG. 5 is a diagrammatic view showing the manner of tensioning a braided overwrap in forming the tubular structure of this invention.

The ceramic liner precompression is achieved by tensioning the outer prepreg sleeve 12 in a novel manner. Rather than shrink fit a precured graphite prepreg onto the ceramic, precompression is effected by tensioning the fibers in the sleeve 12 prior to curing the matrix. The tensioning scheme can be likened to a "Chinese finger puzzle". The braid is tensioned axially, which decreases the braid diameter until it is in tight radial contact with the insulator 13, in turn bearing radially inwardly against the liner 11. The fiber volume of a braided ply or lamina increases with tension. For example, an initial fiber volume of 45% in the braided ply can be increased to volumes between 65%–75%. As shown diagrammatically exaggerated in FIG. 5, the diameter of the ply decreases from D1 to D2 while the ply length increases from L1 to L2. Also, the fiber angle $\theta$ decreases with tension from $\theta_1$ to $\theta_2$, resulting in a more open mesh structure than the full coverage ply in the initial braided condition. It was found that the amount each ply elongates and the amount of tension required for precompression may vary with the braid angle. The larger braid angles transfer the fiber tension into hoop compression more efficiently and so require less tension. However, the decrease in braid diameter for a given elongation is less at larger braid angles requiring more elongation before ceramic contact is achieved with consequent larger axial travel before tension can be applied. It was found that a braid angle of approximately 65° is preferable in minimizing ply elongation while maintaining reasonable braid tension.

The maximum fiber tension is limited by the shear strength of the bond to the ceramic. The graphite braid is cured under tension on the ceramic insulator 13 and the bond stresses between the graphite braids and the ceramic insulator maintain precompression of the liner. Also, fiber friction provides a significant force to react the fiber tension and to further maintain precompression. The fiber tension is reacted within the laminate by the resin matrix.

Figure 3:
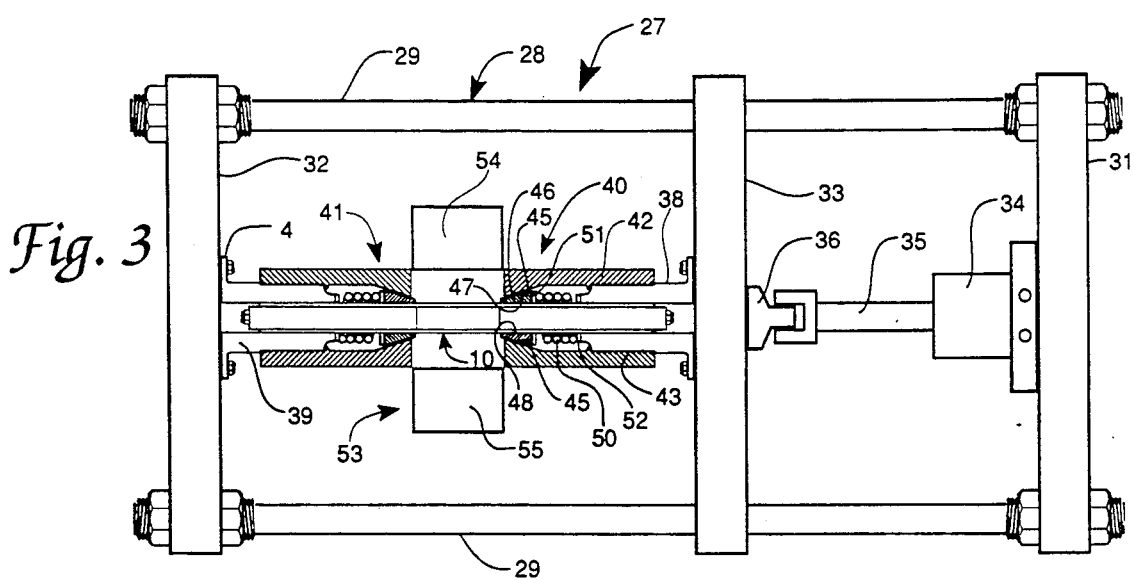
FIG. 3 is a schematic view, in plan, illustrating the apparatus employed in fabricating the tubular structure of this invention.

Referring now to FIG. 3, there is shown an apparatus, comprehensively designated 27, for tensioning the several plies of the laminated graphite fiber braid. The apparatus 27 comprises a structural frame, generally designated 28, which includes longitudinally extending, laterally spaced guide rods 29 suitably connected at their respective opposite ends to cross members 31 and 32 to form a rigid structure. An intermediate cross member or arm 33 is supported on the rods 29 for sliding movement relative thereto. The cross member 33 is movable alon guide rods 29 by a fluid actuator 34 mounted on cross member 31 and having a suitable piston rod 35 pivotally connected at its distal end to an extension 36 projecting from the slidable cross member 33.

A pair of support members 38 and 39 are fixedly secured to slidable cross members 33 and cross member 32 for supporting clamping assemblies 40 and 41, respectively, in an opposed relation to each other. Since the clamping assemblies 40 and 41 are identical in construction and mirror images of each other, it is believed that a detailed description of one, say clamping assembly 40, will suffice for both and the same reference numerals will be used to identify similar parts. Clamping assembly 40 comprises a generally cylindrical casing 42 threadally secured, as at 43, to support member 38 and formed at its distal end with an inner inclined surface 45 tapering radially inwardly and complementary to the outer inclined surface 46 of a wedge member 47. The wedge member 47 has an inner annular surface 48 engagable with the outer surface of the braided sleeve 12.

Figure 6A:
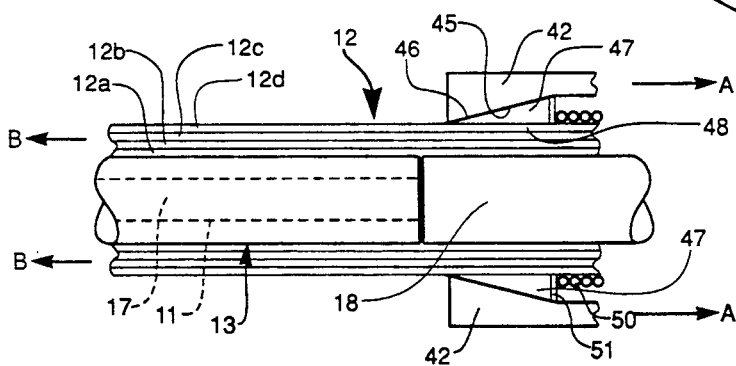
FIGS. 6a–6c are schematic views illustrating the method of elongating and tensioning the several superimposed graphite fiber laminates to impart compressive stresses to the liner forming a part of this invention.
Figure 6B:
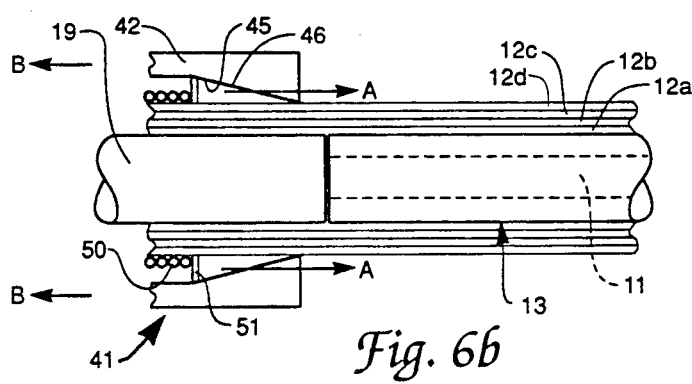
Figure 6C:
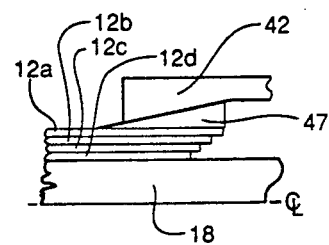

The complementary inclined surfaces 45 and 46 of casing 42 and wedge 47 provide the clamping force required to tension the outer sleeve laminate plies, designated 12a–12d in FIGS. 6a–6c, evenly through a combination of friction and mechanical clamping. The initial load sufficient to ensure that the wedge 47 is in tight gripping contact with the outer surface of the sleeve braid is provided by a spring 50 interposed between opposed abutment plates 51 and 52 bearing against wedge member and the inner end face of support member 38. This spring 50 urges the wedge member 47 axially outwardly to effect by means inclined surfaces 45 and 46 a radially inwardly directed bias of wedge member 47 against the composite barrel 10.

The tensioning apparatus 27 also includes a tube oven 53 comprising a pair of hinged semi-circular clamshells 54 and 55 adapted to encompass the composite barrel for curing the sleeve prepreg.

After the braiding operation, the liner/insulator remains on mandrel assembly 16 between the spaced apart clamping assemblies 40 and 41 with the loose graphite sleeve prepreg extending beyond the opposite ends of the liner/insulator assembly in overlying relation to the sheaths 18 and 19 as shown in FIGS. 6a and 6b.

After the wedge members 47 of the clamping assemblies 40 41 are firmly secured onto the graphite prepreg at locations slightly beyond the opposite ends of liner 11, actuator 34 becomes operative to withdraw piston rod 35 along with cross member 33 to axially move clamping assembly 40 in the direction of arrows A in FIG. 6a away from clamping assembly 41. Axial rearward movement of clamping assembly 40 and thereby casing 42 in the direction of arrows A, via the camming action of sliding surface 45 on surface 46, exerts an inward radial force on wedge member 47 and the graphite prepreg to more firmly grip the and translate the latter therewith relative to sheath 18. The friction between the inclined surfaces 45 and 46 can be reduced by lubrication, if desired. In order to preclude slippage of wedge member 47 along the prepreg outer surface, the former can be formed with grooves or knurls along the inner annular surface 48 thereof. Also, it is desirable to minimize friction between the prepreg inner surface and composite insulator 13 to prevent loss of tension which correlates to a decrease in precompression of the liner 11. To this end, sleeve prepreg 12 can be heated by means of oven 53 prior to tensioning to cause resin flow for lubricating the insulator 13 outer surface and thereby permit relative slip between the prepreg and insulator 13 to minimize tension loss due to friction.

The axial translation of the prepreg in the direction of arrows A (FIG. 6a) tends to move the wedge member 47 of the opposite fixed clamping assembly 41 therewith and, via inclined surfaces 45 and 46 thereof (FIG. 6b), exerts an increasing radial inward force on the left end of prepreg as the latter is further translated by clamping assembly 40 to generate an opposite reactive force in the direction of arrows B. Thus, relative pull forces in opposite directions are applied to the prepreg sleeve to stretch, elongate, and tension the graphite prepreg between clamping assemblies 40 and 41.

For maximum precompression efficiency, all plies 12a-12d must be tensioned equally. To accomplish this, relative ply slip is necessary since the outermost plies elongate further than the inner plies as shown in FIG. 6c. Translation of the wedge member 47 drags the plies 12a-12d therewith until the relative elongations are reached and terminated so that all plies can be tensioned equally.

After the plies are elongated to their limits and fully compacted onto the liner 11, eliminating all slack, further applied forces induce tension in the prepreg to develop via insulator 13 a pressure load on liner 11 and generate internal compressive stresses therein. When sufficient tension is induced in the prepreg to precompress liner 11 to the predetermined compressive stress condition desired, the composite tubular assembly is inserted in oven 53 for a predetermined time under controlled temperature conditions to cure the graphite fiber/epoxy composite while maintained under tension to permanently maintain the compressive stresses induced in liner 11.

From the foregoing, it is apparent that the objects of the present invention have been fully accomplished. As a result of this invention, an improved composite tubular structure comprised of an inner precompressed ceramic liner, an intermediate ceramic thermal insulator, and an outer layer or sleeve of a graphite fiber/epoxy composition is provided for resisting erosion and corrosion caused by elevated internal temperatures and pressures and extreme thermal and mechanical shock. Precompression of the ceramic liner is effected by wrapping and braiding graphite fibers about the liner/insulator, impregnating the graphite fibers with a resinous matrix material, tensioning the braided overwrap axially along the length of the tubular structure, and curing the braided wrap while under tension to maintain the kiner precompressed during subsequent usage under elevated temperature and shock conditions.

It is to be understood that the form of the invention herewith shown and described is to be taken as an illustrative embodiment only of the same, and that various changes in the shape, size and arrangement of parts, as well as various procedural changes, may be resorted to without departing from the spirit and scope of the invention.

We claim:

1. A composite tubular structure comprising: an inner tube of precompressed ceramic material, a thermal insulating composite tube surrounding said inner tube in concentric relation thereto, and an outer braided composite sleeve tensioned to generate and maintain compressive stresses in said inner ceramic tube.

2. A tubular structure according to claim 1, wherein said ceramic material is from the group including silicon nitride, silicon-aluminum-oxy-nitride, aluminum, and silicon carbide whiskered alumina.

3. A tubular structure according to claim 1, wherein said thermal insulating composite tube comprises a plurality of elongated ceramic sections extending lengthwise of said inner tube and disposed in a circular array thereabout.

4. A tubular structure according to claim 3, including a thermal insulating material of low compressive modulus disposed between adjacent ceramic sections.

5. A tubular structure according to claim 4, wherein said insulating material is ceramic paper.

6. A tubular structure according to claim 4, wherein said insulating material is carbon based fiberous paper.

7. A tubular structure according to claim 1, wherein said braided composite sleeve comprises braided graphite fibers impregnated with a resinous material.

8. A tubular structure according to claim 7, wherein said resinous material is a thermosetting polymide having a continuous use temperature up to 600° F.

9. A method of fabricating a tubular structure exposed to high internal pressures and temperatures comprising the steps of: providing a ceramic inner tube, disposing a composite thermal insulating tube about said inner tube, forming a graphite/epoxy sleeve around said insulating tube, applying tension longitudinally to the opposite ends of said sleeve to create a pressure load on said insulating tube for transmission to said inner tube and generate compressive stresses therein, and curing said sleeve while tensioned to maintain precompression in said inner tube.

10. A method according to claim 9, wherein said graphite/epoxy sleeve is formed by cross winding resin impregnated graphite fibers about said insulating tube to form a braided ply thereabout.

11. A method according to claim 9, wherein said graphite/epoxy sleeve is formed by cross winding graphite fibers about said insulating tube to form a braided ply thereabout, and impregnating said braided ply with a resin material while said fibers are under tension.

12. A method according to claims 10 or 11, further including, the step of forming a plurality of said plies about the insulating tube to achieve the desired sleeve thickness.

13. A method according to claims 10 or 11, wherein said graphite fibers are wound about said insulating tube at an angle of approximately 65° relative to the longitudinal axis of said insulating tube.

14. A method according to claim 9, wherein said composite insulating tube is formed of a plurality of elongated ceramic sections disposed in a circumferential array about said inner tube.

15. A method according to claim 14, including interposing thermal insulation material of a low compressive modulus between adjacent ceramic sections.

16. A method according to claims 10 or 11, wherein said graphite fibers are initially wound about said insulating tube at an angle of approximately 65° relative to the longitudinal axis of said insulating tube, and reorienting said graphite fibers during tensioning to an angle of about 45° relative to the longitudinal axis of said insulating tube.

* * * * *

UNITED STATES PATENT AND TRADEMARK OFFICE
CERTIFICATE OF CORRECTION

PATENT NO. : 5,125,179
DATED : June 30, 1992
INVENTOR(S) : Thomas G. Campbell et al It is certified that error appears in the above-identified patent and that said Letters Patent is hereby corrected as shown below:

```
Column 1, line 32,  --steel-- should follow "each".
Column 1, line 60,  "coolin" should be --cooling--.
Column 1, line 65,  "induc" should be --induced--.
Column 1, line 66,  --during-- should follow "liner".
Column 2, line 54,  a comma should follow "invention".
Column 3, line 30,  a slash should follow "ceramic".
Column 6, line 33,  "alon" should be --along--.
Column 6, line 64,  --47-- should follow "member".
Column 6, line 66,  --means-- should follow "by".
Column 7, line 12,  --and-- should follow "40".
Column 7, line 22,  --prepreg-- should follow the first
        occurrence of "the".
Column 8, line 16,  "kiner" should be --liner--.
```

Signed and Sealed this

Nineteenth Day of October, 1993

Attest:

BRUCE LEHMAN

*Attesting Officer*   *Commissioner of Patents and Trademarks*